April 19, 1960 — H. F. SCHNEIDER ET AL — 2,933,096
MECHANICAL OVERPRESSURE RELIEF VALVE
Filed Oct. 24, 1958 — 3 Sheets-Sheet 1

INVENTORS
HERMAN F. SCHNEIDER
CHARLES M. HOWARD
CLARENCE F. FURST
BY
ATTORNEYS

April 19, 1960 H. F. SCHNEIDER ET AL 2,933,096
MECHANICAL OVERPRESSURE RELIEF VALVE
Filed Oct. 24, 1958 3 Sheets-Sheet 2

INVENTORS
HERMAN F. SCHNEIDER
CHARLES M. HOWARD
CLARENCE F. FURST
BY
ATTORNEYS ced Apr. 19, 1960

United States Patent Office

2,933,096
MECHANICAL OVERPRESSURE RELIEF VALVE

Herman F. Schneider, Tullahoma, Charles M. Howard, Shelbyville, and Clarence F. Furst, Tullahoma, Tenn., assignors to the United States of America as represented by the Secretary of the Air Force Application October 24, 1958, Serial No. 769,453

12 Claims. (Cl. 137—70)

This invention relates to improvements in automatic pressure relief valves, and more particularly to a supersensitive automatic pressure relief valve for large pressure vessels and duct systems containing air or other gases under pressure.

Large pressure vessels and duct systems containing air or other gases under pressure, like wind tunnel systems, frequently require protection from overpressure due to the malfunction of its control systems or other elements of the plant. In many cases where the usual spring loaded pressure relief valves are employed they are not large enough or sensitive enough to discharge the large quantities of gas or air required for the necessary quick reduction of the dangerous overpressures in the systems.

Rupture disks often employed for this purpose require a rather high percentage of pressure increase or working pressure differential before the disks break. Since the stress in the membranes or disks has to rise from a safe operating pressure condition to the rupture stress, due to fatigue, they change continuously the bursting pressure and finally fail prematurely at or below the upper limits of the operating pressure, also, they are not easily usable for systems which occasionally are under vacuum. In all known types, the use of means for causing the opening of the relief valve at precise predetermined overload pressure has not been accomplished.

An object of the invention is the provision of an overload relief valve of comparatively large area for venting a large pressure vessel or duct system such as a military wind tunnel and means operable upon a small precise predetermined pressure overload in the system for controlling the relief valve to vent the system for quickly relieving the pressure therein.

A further object is the provision of a pressure relief valve device which remains closed at operating pressure with a reasonable margin of safety and opens rapidly when the pressure in the system reaches a value not more than 10 percent above the operating pressure, and which can be built large enough to discharge large quantities of air from the system quickly and positively.

A further object is the provision of a pressure relief valve means which is held closed by a shear or shearable member and includes means operable by a precise predetermined pressure which is in excess of the normal operating pressure for rupturing the shear member to release the relief valve to permit the same to open and relieve the pressure in the system.

A further object is the provision of pressure-operated means for camming the relief valve toward venting position to rupture the shear member to permit the relief valve to open and vent the system.

A further object is the provision of expansible diaphragm means operable upon a predetermined pressure to actuate the camming means for moving said relief valve toward open position to rupture the shear member and release the valve for free opening to vent the system.

A further object includes the provision of a pressure supply passage connected between a source of pressure in the system and the diaphragm means and a pressure operated safety valve in the pressure supply passage operable upon a predetermined pressure to admit pressure from the system into said diaphragm means to actuate the camming means to move the pressure relief valve toward open position to rupture the shearable member to permit the valve to open freely to vent the system.

Other objects and advantages will become apparent from the following description and accompanying drawings in which like reference characters refer to like parts in the several figures of the drawings in which.

Figure 1:
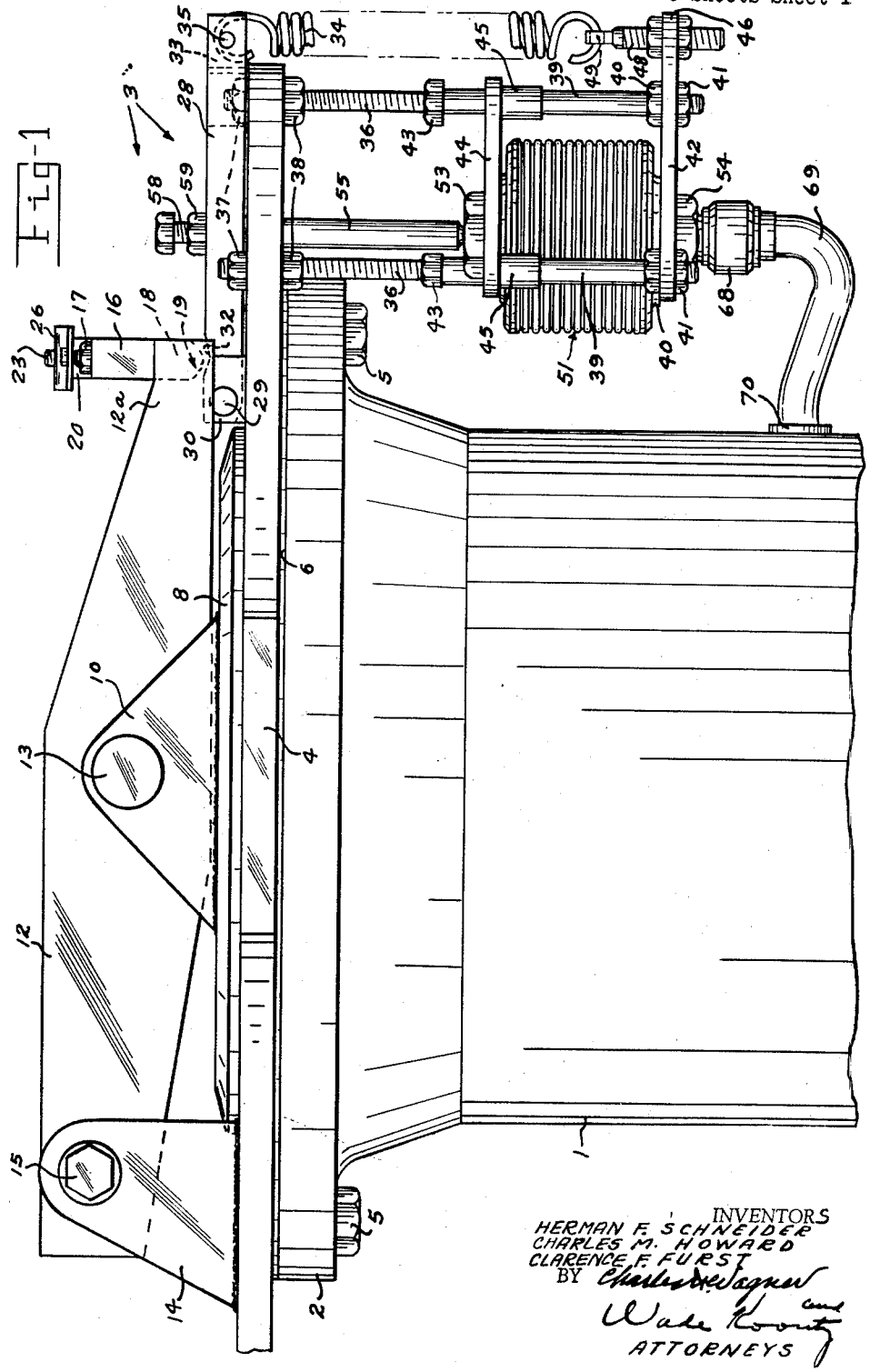
Figure 1 is a fragmentary side elevation of a pressure relief conduit for a pressurized vessel or system, such as a wind tunnel having our improved automatic overpressure relief valve means incorporated therein and shown in closed position.

Referring to the drawing the reference numeral 1 denotes a large pressure relief conduit, extending from a large pressure duct or system (not shown) such as a wind tunnel, for relieving the pressure therein.

The extremity of the conduit 1 is provided with an annular flange 2, on which is supported and connected our improved and supersensitive pressure relief valve indicated generally at 3.

A support plate 4 is secured to the flange 2 by bolts 5 with a gasket 6 therebetween to prevent leakage. The plate 4 is, of course, formed with a vent outlet opening 7 disposed to coincide with the periphery of the pressure relief passage in the relief conduit 1 and the upper surface of the support plate 4 surrounds the vent opening 7 and is flat to form a flat seat for the annular plate or relief valve 8. If desired suitable annular sealing gasket means may be provided on the lower surface of the valve 8 for sealing engagement with the upper surface of the support plate 4, such as an O ring 9.

The plate valve 8 is provided with two pairs of spaced upstanding ears or lugs or brackets 10—10 and 11—11, the relief valve 8 being carried by a pair of spaced lever arms 12, one of which is disposed in the space between the ears or lugs 10—10 while the other lever arm is disposed between the lugs or ears 11—11. The arms 12 are pivotally connected thereto intermediate their lengths by the pivot pins or shafts 13.

Figure 2:
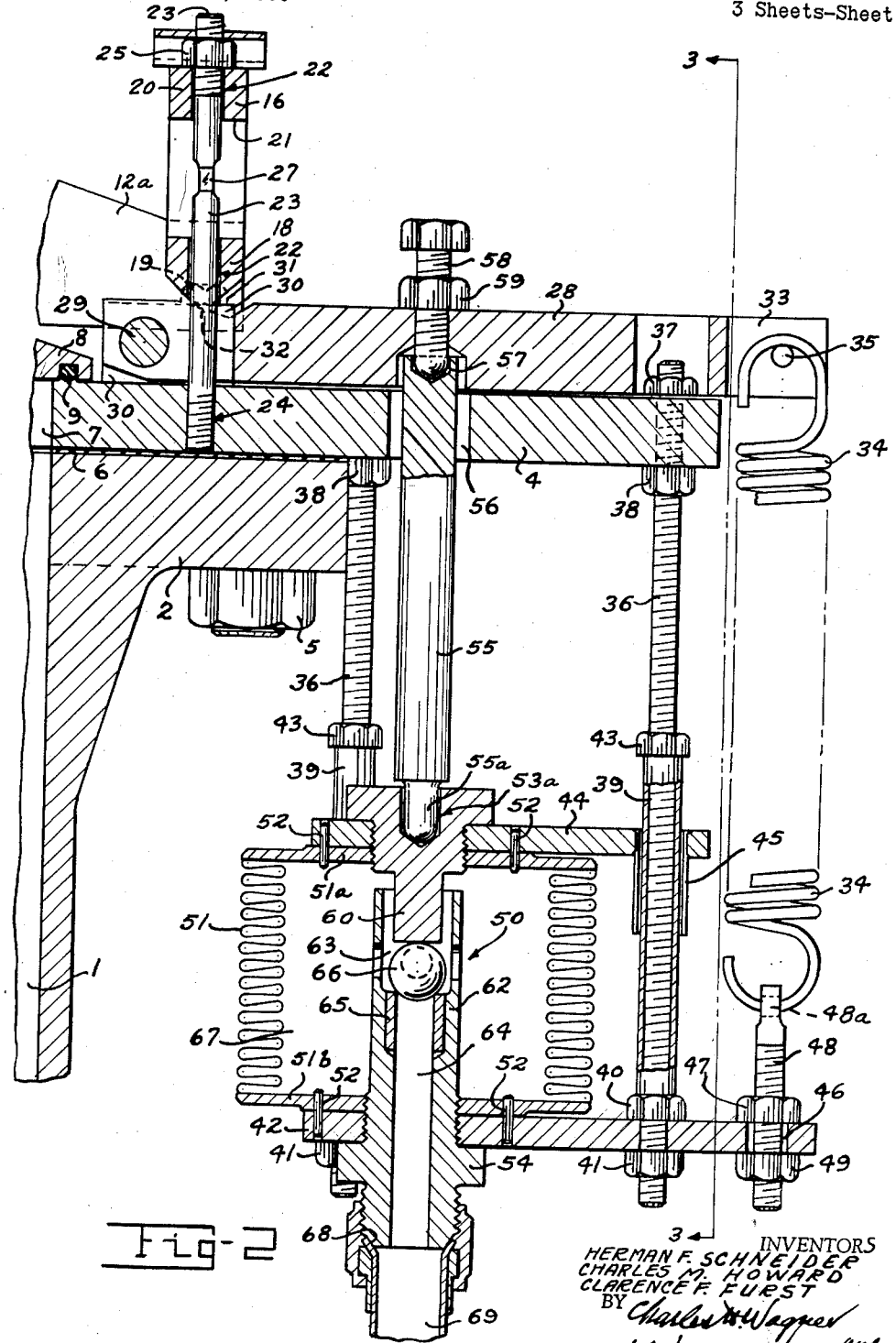
Figure 2 is an enlarged detail sectional view, parts being broken away, and taken substantially in a plane through the longitudinal center of the pressure relief conduit.

The support plate 4 is also provided with upstanding ears or lugs 14 adjacent the periphery of the plate valve 8, as shown in Figures 1 and 2, and the "dead ends" of the two levers or arms 12 are pivoted to the ears 14 by the pivot means or shaft 15.

This arrangement permits the pressure relief or plate valve 8 to swing upwardly freely away from the support plate 4 to a full open position away from the mouth of the pressure relief passage in the relief conduit 1, when the lever arms 13 are released.

The two valve lever arms 12 are connected together at their forward or free ends 12ª by a heavy strong cross bar 16 which is secured to the ends 12ª by bolts or studs 17.

Figure 3:
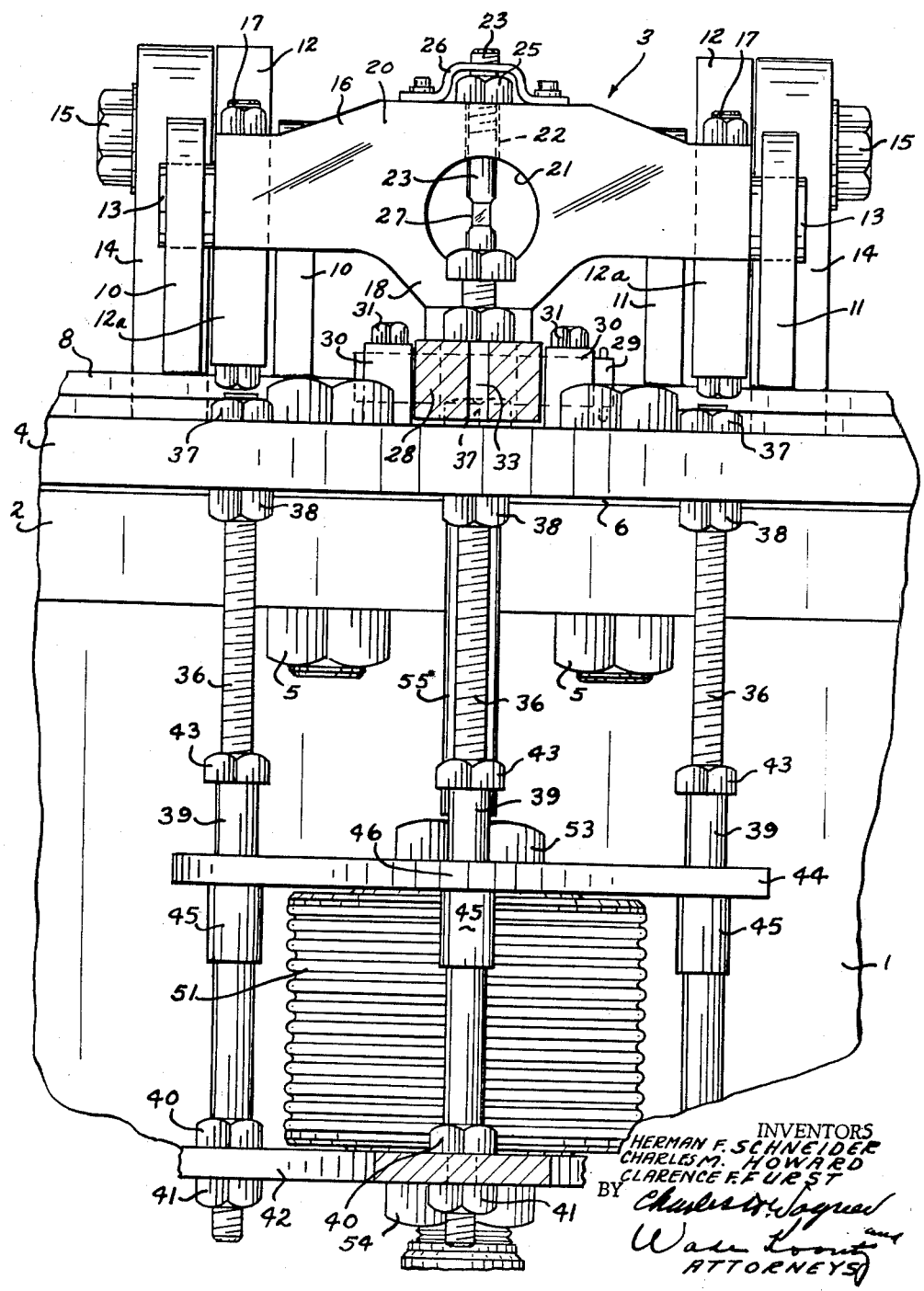
Figure 3 is a vertical sectional view taken about on the plane indicated by line 3—3 in Figure 2 and looking in the direction of the arrows.

As seen in Figures 2 and 3 the cross bar 16 is deeper intermediate its ends, having a downwardly projecting portion 18 terminating in a rounded cam engaging surface or nose 19 and the bar 16 has an upwardly projecting intermediate portion 20 formed with an opening 21 located centrally between the ends of the cross-bar 16 and in the portions 18 and 20.

The cross bar 16 is also formed with a vertical passage or bore 22 through which a valve holding shearable member or rod 23 extends. The shearable rod 23 is threaded at its lower end into a threaded socket 24 formed in the plate 4 and its upper extremity extends above the top flat surface of the cross bar 16 and is threaded, and receives a hold-down nut 25. After the shearable rod 23 is secured in place in the support plate 4 with the valve plate 8 closed, the hold-down nut 25 is tightened down to secure the plate valve 8 down tight against the upper or valve engaging surface of the support plate 4, closing the vent passage in the pressure relief conduit 1 leading from the pressure system. A flanged U-shaped keeper 26 may be provided to protect the nut 25 against tampering and prevent accidental turning and loosening.

The shearable rod 23 is reduced in cross section at a point 27 which is visible in the opening, as seen in Figures 2 and 3, to localize the shear point in the rod. This shear point may be square in cross section to receive a wrench for tightening or loosening the rod in the support plate 4.

Valve opening means comprising a camming lever 28 is provided for camming the levers 12 upwardly around the pivot means 29 to rupture the hold-down or shearable rod 23 at the shear point 27. The camming lever 28 is pivoted at one end on the pivot means or fulcrum pin 29 which is journalled in spaced brackets or ears 30 secured to the support plate 4 by bolts or studs 31 adjacent the periphery of the relief valve disk 8.

The camming lever 28 extends forwardly under the nose portion 19 of the cross bar 16 and is bifurcated between the pivot brackets 30 to allow the shearable rod 23 to pass through the pivot end of the lever 28, and the valve opening means or camming lever 28 is provided with a cam surface at 32 on its upper side adjacent the pivot pin 29 for camming engagement with the nose 19 of the main relief valve lever assembly 12—16.

The camming lever 28 also has its outer end bifurcated or slotted at 33 to receive the upper end of an adjustable hold-down tension coil spring 34 which has a predetermined hold-down tension and is hooked on a pin 35 on the camming lever extending across the slot 33. Three depending supports or hanger rods 36 having the function of guide rods and are secured in the support plate 4 by nuts 37 and 38, the rods 36 being threaded their entire length and carry smooth guide sleeves or bushings 39 extending upwardly from nuts 40 and 41 which clamp and support the lower bellows of the expansible chamber and safety valve supporting plate 42 in predetermined spaced relation below the main support plate 4. The plate 42 may be raised or lowered by adjusting the nuts 37 and 38, or the nuts 40 and 41 and the nuts 43 which hold the guide sleeve members 39 down against the nuts 40.

A vertically movable plate 44 or camming lever actuating plate constituting the movable end of the expansible chamber or bellows is provided with guide sleeves 45 fixed therein and slidable on the guide sleeve bushing 39 providing parallel vertical movement for the plate 44.

The lower or stationary plate 42 has a forward extension apertured at 46 to receive a threaded hold-down stem member 48 for connection with the lower end of the spring 34 as seen in Figure 2, having an eye 48ª through which the lower end of the spring 34 is hooked. By adjusting the nuts 47 and 49 the stem of the member 48 and the eye 48ª can be raised or lowered to adjust the effective downward tension on the outer end of the camming lever 28 which in turn adjusts the predetermined "pop off" pressure of a safety valve member 50 located within an expansible chamber comprising a bellows 51 having its upper end sealed to the movable plate 44 and its lower end sealed to the adjustable stationary plate 42. The bellows 51 may be of the conventional annular corregated type as shown, having upper and lower end plates 51ª and 51ᵇ which are pinned in position on the upper and lower plates 44 and 42 by pins 52 and secured by the threaded stems of the upper and lower plug members 53 and 54.

The upper plug 53 has a recess 53ª in its upper end in which the lower reduced rounded end 55ª of a camming lever thrust or push rod 55 is seated. The camming lever push rod 55 extends upwardly through an aperture 56 in the support plate 4 and is recessed at 57 at its upper end to receive the lower rounded end of an adjustable stud or thrust member 58 locked by a lock nut 59.

The plug 53 is threaded through the plates 44 and 51ª and has a depending reduced extension 60 for seating engagement of the ball valve member 66 of the safety check valve 50.

The lower plug 54 has an auxiliary pressure passage therethrough and is threaded through the lower stationary plate 42 and adjacent stationary plate 51ᵇ and has an upward tubular extension 62 which is counterbored at 63 to receive the depending end 60 of the plug 53 and is provided with a discharge conduit 64 in which is fitted a valve seat bushing 65 for seating the ball or safety valve 66 to close the second pressure inlet or supply passage 64, lateral exhaust ports from the passage 63 being provided into the diaphragm or expansible chamber 67.

The lower end of the plug 54 is threaded and flanged at 68 to provide a nipple union for the small pressure supply passage or conduit 69 which is disposed in communication with the interior of the main pressure relief conduit 1 at 70 as seen in Figure 1.

In the operation the parts are first adjusted to the position as shown in full lines in the drawing, particularly Figure 2.

The shearable rod 23 holds the main pressure relief valve 8 down closed. The camming lever 28 is held down by the predetermined adjustment of the spring 34 so as to provide the desired predetermined critical downward pressure on the stem 55 holding the safety ball valve 66 down closed on its seat 65.

By adjusting the nuts 47 and 49 the ball valve can be held on its seat up to any desired predetermined critical pressure in the pressure conduit 1 through the connecting pressure supply passage 69, and when this critical pressure is reached the ball valve will "pop" up and discharge pressure from the system into the closed expansible bellows chamber 67.

The increased operative area on the end of the bellows chamber 67—51ª greatly increases the upward force on the push rod 55 rocking the camming lever 28 upwardly to impinge the camming surface 32 of the lever 28 by engaging the nose 19 of the cross bar 16, forcing the same upwardly until the reduced rupture point 27 in the hold-down or shearable rod 23 breaks, thus freeing the valve lever 12 to allow the relief valve 8 to open freely under the pressure in the main pressure relief conduit 1, thus venting the system quickly to reduce the pressure therein.

The shear point area 27 must be made to hold the main relief valve down on its seat under normal working pressure in the system plus a predetermined excess or overload. The pressure above the rupture of the shear point, if determined entirely by the pressure on the area of the main relief valve, is somewhat uncertain and may vary considerably, which may not be sufficient for keeping the pressure in the system at a safe working pressure with a small degree of allowance for an increase pressure.

However, by employing a very slight increase in the upper limit of safe operating pressure to unseat the "blow off" type of safety valve as contemplated herein to discharge the pressure into a materially larger expansible closed diaphragm chamber to operate a camming lever having a material fulcrum advantage as contemplated herein to cam the main valve lever to shear the hold-down means, a device is accomplished which can be made supersensitive to release a main large pressure relief valve upon a very small differential pressure above the upper limit of a predetermined safe operating pressure so as to immediately vent the system to relieve the pressure therein when said upper limit is even slightly exceeded.

The shear tension of the shearable rod 23 is so proportioned to the operative area of the relief valve 8 subject to the pressure in the main relief conduit 1 that the rod 23 will hold the valve 8 closed for an increase in the operative pressure above the predetermined upper safe limits. The operative area of the expansible chamber 51's movable end is so proportioned that when the chamber 51 is pressurized the camming lever 28 will be actuated to rupture the shearable member 23 within the safe operating pressure limits, and the tension of the spring means 34 relative to the operative area of the pressure on the ball valve 66 is so proportioned that the safety valve will "pop" open immediately upon the pressure in the pressure supply passage 64 passing the upper limit of the safe operating pressure in the pressure relief conduit 1.

When the pressure in the second pressure supply passage 64 reaches the predetermined pressure, as determined by the predetermined tensioned spring means 34 which is preferably calibrated to provide a hold-down value not more than 10 percent above the maximum safe operating pressure in the system when the tension on the spring means 34 is overcome and the safety valve 50 opens, admitting pressure into the expansible chamber 51. The pressure on the operative area of the movable end wall 51ᵃ of the expansible chamber 67 being materially greater than the hold-down tension of the shearable means 23 plus the fulcrum advantage of the camming lever 28, the camming lever 28 is actuated to positively raise the valve lever arms 12 and rupture the shearable rod 23 and permit the relief valve 8 to open freely and quickly to vent the system.

Having thus described our invention as related to a typical embodiment of the same, it is our intention that the invention be not limited by the details of the drawings and description but rather by the spirit and scope of the invention as set out in the accompanying claims.

We claim:

1. A pressure relief valve for a pressurized system to relieve the pressure therein when it exceeds a predetermined value comprising; a pressure relief conduit, pressure relief valve means closing said conduit and freely movable to open said conduit to relieve pressure therein; shearable connecting means between said relief valve means and said relief conduit for holding said valve means closed, camming means engageable with said valve means to cam said valve means toward open position to rupture said shearable connecting means to free said valve means for opening, adjustable resilient means connected between said camming means and said conduit for urging said camming means toward a noncamming position, pressure operated means engaging said camming means for actuation thereof to cam said valve means toward open position to rupture said shearable connecting means, pressure supply passage means connected in communication between said pressure operated means and said pressure relief conduit for pressurizing said pressure operated means from said conduit to move said camming means to cam said valve means toward open position to shear said shearable means, and a second predetermined pressure operated valve means in said pressure supply passage opening toward said pressure operated means for closing said pressure supply passage, and thrust means between said predetermined pressure operated valve means and said camming means for holding said second predetermined pressure operated valve means closed by said camming means under the influence of the adjustable resilient means to hold said camming means inoperative until the pressure in said pressure supply passage in communication between said pressure relief conduit and said predetermined pressure operated valve exceeds a predetermined safe operating pressure whereby to unseat said predetermined pressure operated valve means to admit pressure from said pressure supply passage into said pressure operated means for actuation of said camming means to cam said pressure relief valve toward open position to rupture said shearable connection to free said pressure relief valve and vent said pressure relief conduit.

2. In an automatic predetermined pressure relief valve structure for a pressurized conduit comprising; a support, a main pressure relief valve means carried by said support for venting the pressurized conduit to relieve the pressure therein, a shearable connecting member connected between said support and said main relief valve means for holding said valve means closed having a predetermined shear tension to rupture and free said valve means for free opening to vent the conduit, a camming lever carried by said support for camming said valve means toward open position to rupture said shearable member, an expansible pressure chamber having a non movable end fixed relative to said pressurized conduit and a movable end engageable with said camming lever intermediate its ends to rock said camming lever to cam said main relief valve means toward open position to rupture said shearable member to free said main relief valve, a safety valve device within said expansible pressure chamber comprising a pressure operated valve, means holding said pressure operated valve closed on its seat by said movable end under the influence of tension applied in one direction on the movable end of said camming lever for moving said camming lever toward noncamming relation to said main valve means, comprising adjustable spring tension means connected between the nonmovable end of the expansible pressure chamber and the free end of said camming lever, having a predetermined tension for holding said safety valve closed, said safety valve arranged to discharge into said expansible chamber when said safety valve is opened for expanding the expandable pressure chamber to rock said camming lever to cam said main valve means toward open position to rupture said shearable means to release said main valve for free opening, and a pressure supply passage connected at one end to the pressure relief conduit and at its other end to said safety valve for introducing the pressure in said pressure supply conduit into said expansible chamber when said safety valve is opened to expand said expansible pressure chamber and rock said camming lever into camming action with said main relief valve means.

3. In an automatic pressure relief device for a pressurized system for quickly relieving the pressure therein comprising; a support plate having a venting opening therein and adapted to be secured to a pressure relief conduit with the vent opening in alignment with the latter conduit, plate type valve means for closing said venting opening freely movable away from said support plate to open said venting opening, valve hold-down lever means pivoted at one end to said support plate, extending across the valve means and pivotally connected intermediate its ends to said valve means, a hold-down shearable rod connected between said supporting lever and said support plate for holding said valve means closed, and adapted to rupture and free said supporting lever upon a predetermined increase in upward pressure on the free end of said lever means in a direction away from said support plate, camming lever means pivotally connected at one end to said support plate and having a camming portion intermediate its ends for upward camming engagement with the free end of said valve hold-down lever means to rupture said shearable rod, resilient predetermined tension means connected between said support plate and the free end of said camming lever means for yieldably holding said camming lever means in inoperative noncamming position, expansible chamber means disposed between said support plate and said camming lever means, adapted when pressured to urge said camming lever means into camming engagement with said valve hold-down lever means to cam the same upwardly to rupture said shearable rod and free said relief valve, safety valve means opening toward said expansible chamber in communication with the interior of said expansible chamber, safety valve hold-down thrust means between said safety valve means and the free end of said camming lever means for holding said safety valve means closed while said camming lever means is disposed in noncamming relation to said hold-down lever means, and a pressure supply passage for said safety valve means adapted to be connected in communication with the interior of said pressure relief conduit.

4. In an automatic pressure relief valve for venting a pressurized system comprising; a main pressure relief conduit for said system having a vent outlet, a valve lever extending across said outlet pivoted at one end to said conduit, a main relief valve member carried by said lever for closing said vent outlet, a shearable connection between the other end of said valve lever and said conduit tensioning said valve lever toward said vent outlet when said valve is in closed position to hold said valve closed, a bellows chamber fixed to said conduit having a movable end wall, a camming lever pivotally connected at one end to said conduit having camming means thereon disposed for impinging engagement with the free end of said camming lever for moving said camming lever outwardly away from said outlet to further tension and rupture said shearable connection to release said valve lever for free swinging movement away from said outlet when said bellows chamber is pressurized, a first pressure supply passage disposed in communication with the interior of said pressure relief conduit, a second pressure relief valve normally closing said pressure supply passage, a second pressure supply passage connected in communication between said second pressure relief valve and said bellows chambers for conducting pressure passing said second pressure relief valve into said bellows chamber to pressurize said bellows chamber, a first rigid thrust means interposed between said movable end wall and said camming lever, second rigid thrust means interposed between said end wall and said second pressure relief valve for holding the same closed, and resilient tension means connected between said camming lever and the fixed bellows chamber having a predetermined tension for yieldably holding said camming lever, through said first and second thrust means in holding engagement with said second pressure relief valve for yieldably retaining said second pressure relief valve closed until said second pressure relief valve is opened by a predetermined relative increase in pressure in said first pressure supply passage in excess of the holding tension of said resilient tension means of said camming lever to overcome said tension and open said second pressure relief valve to pressurize said bellows chamber, whereby pressure is admitted into said bellows chamber to force said camming lever, through the second rigid thrust means, into camming engagement with said valve lever to rupture said shearable connection and free said main relief valve for free opening to vent said main pressure relief conduit.

5. An automatic predetermined pressure-operated relief valve device for a pressurized system such as a pressurized wind tunnel, a main pressure relief conduit having a vent outlet and adapted to be connected to a pressurized wind tunnel to vent the same to relieve the pressure therein, a main pressure relief valve closing said vent outlet and freely movable out of said vent outlet to open the same, a shearable connection between said main valve and said main relief conduit for holding said main valve closed, a camming lever pivotally connected at the end to said main relief conduit at one side thereof and movable into camming engagement with said valve to force said main valve toward open position against the tension of said shearable connection to rupture the shearable connection to free said main valve to vent said main relief conduit, spring means operatively connected between said camming lever and said conduit having a predetermined tension for holding said camming lever out of camming engagement with said main valve, pressure operated means cooperating with said camming lever for forcing said camming lever into camming engagement with said main valve against the predetermined tension of said spring means to force said valve toward open position to rupture said shearable connection and allow free opening of said main valve to vent said conduit, a pressure supply passage connected in communication between said main pressure relief conduit and said pressure operated means, a safety valve disposed in said pressure supply passage opening outwardly toward said pressure-operated means to admit pressure to said pressure-operated means, and safety valve seating means interposed between said safety valve and said camming lever for holding said safety valve closed when said camming lever is tensioned by said spring means in noncamming relation to said main valve under tension of said spring means, said safety valve having a predetermined operative pressure area for opening said safety valve exposed to pressure in said pressure supply passage to unseat and open said safety valve when the pressure on said area exceeds the predetermined holding tension of said spring means on said camming lever, said predetermined pressure-operated means having an increased operative pressure area relative to the aforesaid pressure area for moving said camming lever when pressurized which exceeds the shearing tension of said shearable connection when said pressure operated means is pressurized by opening of said safety valve.

6. In a pressure relief valve device for a pressure system having a main pressure relief conduit, a main pressure relief valve for opening and closing said main relief conduit, an auxiliary pressure supply conduit connected to said main pressure relief conduit, a safety valve closing said auxiliary conduit and opening outwardly to vent said auxiliary conduit, a closed expansible chamber surrounding said safety valve to receive pressure from said auxiliary conduit when said safety valve is opened and having a movable end and a nonmovable end, a camming lever pivoted to said main conduit and extending across the movable end of said expansible pressure chamber, hold-down thrust means between said safety valve and said camming lever for holding said safety valve closed when said camming lever is in a first noncamming position to prevent pressure in said auxiliary conduit from entering and pressurizing said expansible pressure chamber, hold-down spring means operatively connected between said camming lever and said nonmovable end having a predetermined tension for yieldably holding said camming lever in said noncamming position, the effective tension of said spring means exceeding a safe normal effective working pressure in said auxiliary conduit on said safety valve tending to open the same and less than a predetermined increased effective working pressure in the auxiliary conduit above said predetermined safe effective working pressure, a main venting valve lever pivotally carried by said main pressure relief conduit and extending across said main pressure relief conduit and over said camming lever to move the same toward open position for camming engagement by said camming lever, pivotal connecting means between said main pressure relief valve and said camming lever, a hold-down shearable connection operatively connected between said main camming lever and said main pressure relief conduit having a predetermined shearing stress greater than a predetermined excess safe effective working pressure in said main relief conduit on the area of said main pressure relief valve tending to open said main pressure relief valve and materially less than said effective safe working pressure on said main pressure relief valve tending to open the same plus the camming pressure of said camming lever on said main valve lever, when the same actuated by said pressure-operated means to cam said main valve lever to open said main relief valve.

7. In a pressure relief valve, a support plate having a vent opening therein adapted to be secured to the venting end of a pressure relief conduit with said vent opening in register with the end opening in the relief conduit, a pair of parallel pressure relief valve levers pivoted at their ends to said plate at one side of said vent opening and extending across said opening, a cross bar fixed to the outer ends of said levers, a pressure relief valve for closing said vent opening pivotally connected to said levers intermediate the ends thereof, a shearable rod connected between said support plate and said cross bar tensioned for holding said valve closed on said vent opening, a camming lever pivotally connected at one end to said support plate and extending under said cross bar for camming engagement with said cross bar to cam said cross bar and said levers upwardly to rupture said shearable rod and free said relief valve for free opening away from said vent opening, an expansible bellows chamber operatively fixed at one end to said plate, having an end wall movable toward and away from said plate, thrust means between said movable end wall and said camming lever for moving said camming lever into camming engagement with said cross bar, when said end wall is moved toward said plate by expansion of said bellows chamber, a pressure supply passage extending into said expansible chamber opposite said movable end wall having an opposite end adapted to be connected to the aforesaid pressure relief conduit to receive pressure therefrom, a check valve closing the end of said supply passage within said expansible chamber and opening inwardly toward the interior of said bellows chamber, thrust means interposed between said movable end wall and said check valve holding said check valve closed when said end wall is moved in a direction away from said support plate by movement of said camming lever to a nonoperative position out of camming engagement with said cross bar, and spring means operatively connected between said support plate and said camming lever for yieldably holding said camming lever in said nonoperative noncamming position.

8. Apparatus as claimed in claim 7 in which said shearable rod has a predetermined shear stress at least as great as an effective predetermined effective safe excess operating pressure on the area of said pressure relief valve in said vent opening tending to open said valve, and said spring means has a predetermined effective tension holding said camming lever in noncamming position equal to a predetermined effective safe operating pressure on the area of said check valve tending to unseat the same plus a predetermined safe excess working pressure on the area of the check valve tending to unseat said check valve.

9. In an automatic predetermined pressure relief device for a pressure relief conduit, a support having a pressure relief vent opening therein, pressure relief valve means for closing said vent opening and freely operable to uncover said opening, shearable means carried by said support for normally holding said valve closed, valve opening means carried by said support having an inoperative portion and actuatable for moving said valve toward an open position to rupture said shearable means and free said valve for free opening to uncover said vent opening, means connected to said support for yieldably holding said valve opening means in an inoperative position, pressure operated means carried by said support for actuating said valve opening means to move said valve toward open position to rupture said shearable means, a pressure supply passage for supplying pressure to said pressure operated means for actuating said pressure operated means, a second valve in said pressure supply passage for closing said pressure supply passage and opening outwardly toward said pressure operated means, and means interposed between said second valve and said valve opening means for holding said secondary valve closed while said valve opening means is in said inoperative position.

10. Apparatus as claimed in claim 9, in which the operative area of said pressure operated means and the shearing tension of said shearable means are such that when the pressure operated means is pressurized said valve is moved by said valve opening means to shear said shearable means, and the operative area of the secondary valve means and the tension of said means for yieldably holding said valve opening means in inoperative position is such as to cause the unseating of the secondary valve means when the pressure in the pressure supply passage exceeds a predetermined safe working pressure in said passage whereby pressure is admitted to said pressure operated means by the opening of said auxiliary valve for moving the valve opening means to open the first mentioned valve.

11. Apparatus as claimed in claim 10 in which, the valve opening means is a camming lever movable from an inoperative position out of contact with the first mentioned valve means into camming engagement with the first valve to move the same toward open position and said pressure operated means is an expansible chamber having a movable end, having thrust means between the movable end and the camming lever, and the operative pressure area on said movable end is greater than twice the operative pressure area of the secondary valve means tending to unseat the secondary valve means for admitting pressure into said expansible chamber, and the means for holding said secondary valve closed is a thrust member interposed between said movable end and the secondary valve.

12. Apparatus as claimed in claim 11 wherein, the first mentioned valve means includes a plate valve, and a valve lever pivotably carrying said plate valve and said camming lever impinges said valve lever to open said first mentioned valve, and the means for yieldably holding said secondary valve means in inoperative position comprises a spring means operable between said expansible chamber and the camming lever having a predetermined tension for holding said camming lever in the inoperative position until pressure on the operative area of the secondary valve exceeds the effective predetermined tension on the spring means.

References Cited in the file of this patent

UNITED STATES PATENTS

| | | |
|---|---|---|
| 1,394,072 | Egbert | Oct. 18, 1921 |
| 2,291,374 | Canfield | July 28, 1942 |